(12) United States Patent
Higuchi et al.

(10) Patent No.: US 6,241,358 B1
(45) Date of Patent: Jun. 5, 2001

(54) TANDEM LIGHTING PANEL

(75) Inventors: Eizaburo Higuchi, Setagaya-ku; Tsuyoshi Ishikawa, Nerima-ku; Akihiro Horibe, Yamato, all of (JP)

(73) Assignees: Nitto Jushi Kogyo Kabushiki Kaisha, Tokyo; Yasuhiro Koike, Kanagawa, both of (JP)

( * ) Notice: Subject to any disclaimer, the term of this patent is extended or adjusted under 35 U.S.C. 154(b) by 0 days.

(21) Appl. No.: 09/423,542

(22) PCT Filed: Mar. 16, 1999

(86) PCT No.: PCT/JP99/01293

§ 371 Date: Nov. 12, 1999

§ 102(e) Date: Nov. 12, 1999

(87) PCT Pub. No.: WO99/50597

PCT Pub. Date: Oct. 7, 1999

(30) Foreign Application Priority Data

Mar. 31, 1998 (JP) .................................................. 10-101792

(51) Int. Cl.[7] ....................................................... F21V 7/04
(52) U.S. Cl. ................................. 362/31; 362/26; 362/27; 362/244; 362/237; 362/248
(58) Field of Search ................................. 362/31, 559, 26, 362/27, 244, 237, 248

(56) References Cited

FOREIGN PATENT DOCUMENTS

| 64-29708 | 2/1989 | (JP) . |
| 08160425 | 6/1996 | (JP) . |
| 09186825 | 7/1997 | (JP) . |
| 09292531 | 11/1997 | (JP) . |

*Primary Examiner*—Sandra O'Shea
*Assistant Examiner*—Ali Alavi
(74) *Attorney, Agent, or Firm*—Staas & Halsey LLP (57) ABSTRACT

A set of light guide blocks B L 1~B L 3 provide a tandem arrangement. The light guide block B L 1 is supplied with light from a primary light source L 1. The other primary light sources L 2, L 3 are arranged in recesses formed around distal portions of the light guide blocks B L 1, B L 2, supplying the light guide blocks B L 2, B L 3 with primary light, respectively. Overlap of mutually neighboring light guide blocks gives tang-shaped overlapping portions 17a, 17b, 27a, 27b as well as overlapping bands 17c, 27c, thereby avoiding electrodes at both ends of the primary light sources L 2, L 3 from causing short of brightness. The light guide blocks B L 1~B L 3 may be in the form of unified single guide plate. Primary light sources L 1~L 3 may have a shape such that electrode sections of both ends are curved. A compact surface light source device with a large emission area is provided.

7 Claims, 7 Drawing Sheets

TANDEM LIGHTING PANEL

FIELD OF INVENTION

The present invention relates to a surface light source device provided with a primary light source emitting light which is converted into an illumination flux having a large cross section to be outputted, more specifically, relates to a tandem light source device comprising a plurality of plate-like light guide blocks disposed tandem. Tandem surface light source devices in accordance with the present invention are applied with advantage in particular to backlighting for LCD (liquid crystal display) having a large display screen.

BACKGROUND

Surface light source devices which employ guide plates made of light scattering and guiding materials or transparent light guiding materials have been proposed and broadly applied to backlighting for LCD and other uses. Conventional surface light source devices are generally classified into a type featured by light supply from a side of light guiding means and another featured by light supply from behind light guiding means. The former is called surface light source device of side-light type.

Figures 1, 1A:
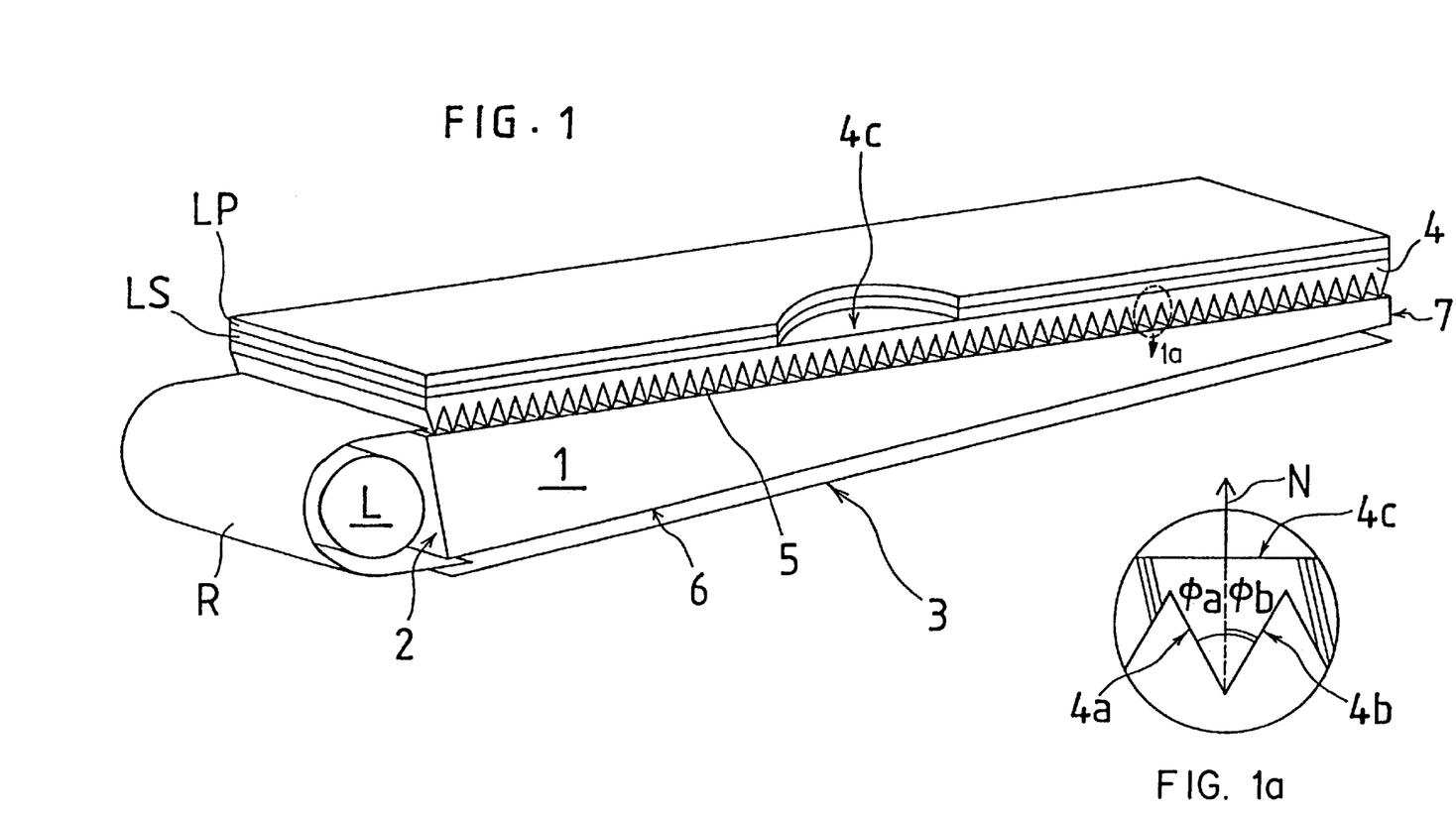
FIG. 1 is a perspective and partially exploded view of liquid crystal display employing a general known surface light source device of side light type for backlighting.

FIG. 1 shows a partially broken perspective view of a LCD employing a conventional surface light source device of side-light type for backlighting. For the sake of illustration, exaggerated are formation pitch and depth of prism sheet and so forth.

Referring to FIG. 1, a guide plate 1 with emission directivity has a wedge-shaped cross section and is a light scattering guide plate or a transparent guide plate. The scattering guide plate 1 is a guide plate made of a known material which is capable of both light guiding and inside light scattering. The material is composed of matrix made of, for example, polymethylmethacrylate (xPMMA) and "substance of different refractive index" which is uniformly dispersed in the matrix. The term, "substance of different refractive index", is defined as substance having refractive index which is substantially different from that of the matrix.

A thicker side end face of the guide plate 1 provides an incidence end face 2 near to which a primary light source (fluorescent lamp) L backed by a reflector R is disposed. A reflector 3 is disposed along one major face (back face) 6 of the guide plate 1. The reflector 3 is made of a silver foil sheet with regular reflectivity or a white sheet with diffusible reflectivity. Illumination light is outputted from another major face (emission face) 5 of the guide plate 1.

A prism sheet 4 is a single-face prism sheet provided with a prismatic surface on one face, being disposed outside of the emission face 5. The prism sheet is orientated so that the prismatic surface is directed inward.

Referring to the broken illustration, an outer face 4c of the prism sheet 4 is shown as an even face. On the outside of the even face 4c, a LCD panel LP is disposed across a polarization separation sheet LS. The LCD panel has a well-known constitution comprising a liquid crystal cell, transparent electrodes and others, which are sandwiched between two polarizer plates having polarization axes crossing perpendicularly to each other.

The polarization separation sheet LS, an optical element in use growingly, is interposed between the prism sheet 4 and an inner polarizer plate of the LCD panel. The polarization separation sheet LS, an optical element in use growingly has a high transmissivity with polarization component having the same direction as the polarization axis of the inner polarizer plate while having a high reflectivity with polarization component perpendicular to the polarization axis of the inner polarizer plate.

The prismatic surface provided by the inner face of the prism sheet 4 has a great number of prismatic element rows. The prismatic element rows are orientated so as to be approximately parallel to the incidence end face 2 of the guide plate 1. As illustrated in a partially enlarged cross section, each prismatic element row is provided with a pair of slopes 4a, 4b forming a V-shaped valley. A first slope 4a is directed toward the incidence end face 2 of the guide plate 1 while a second slope 4b is directed toward a distal portion 7 of the guide plate 1.

Inclination angle φa of the first slope 4a and inclination angle φb of the second slope 4b are either equal (φa=φb or unequal (φa<φb, usually) to each other case by case. The former corresponds to so-called symmetric prism sheet and the latter corresponds to so-called asymmetric prism sheet.

Light from the primary light L is introduced into the guide plate 1 and then is conducted towards the thinner end face 7 while being subject to scattering and reflection. Through this process, illumination light is outputted from the emission face 5 constantly.

Since light supply sideways with respect to the guide plate 1 causes the emission face 5 to emit light having a remarkably sharp directivity as known well, such a guide plate is generally called emission-directive guide plate.

The prism sheet 4 modifies a preferential propagation direction of illumination light, which has been outputted forward and obliquely from the emission face 5 owing to the above-mentioned directivity, toward a desirable direction (approximately frontal direction, usually).

Nevertheless conventional surface light source devices as described above have an advantage that thin structure is allowed, they are subject to serious problems against enlarging of emission area.

Cross section area of illumination flux is, at largest, approximately equal to area of the emission face 5 of the guide plate 1 to which the primary light source L supplies light while practicable size rising of the emission face 5 is limited. In particular, increased depth (distance from the incidence end face 2 and distal portion 7) not only requires the primary light source L to have increased power but also leads to difficulty that uniform brightness over the whole emission face is hardly realized.

In general, serious difficulty arises when depth is greater than about 10 inches. Under such situation, conventional LCDs with large display screen employ surface light source devices of a type such that a plurality of primary light sources are disposed behind light guide means instead of side light type.

Such arrangement makes it difficult to realize thin structure. And besides, difference in brightness is liable to appear between an area just above a primary light source and the other areas. To eliminate this, any element with strong diffusibility must be disposed. Such an element will lead to loss of light.

According to an prior art surface light source device, a pair of primary light sources are disposed at respective end faces of a large-size guide plate (so-called two-lamps type), which is nevertheless subject to disadvantages as follows.

(1) Depth will come to a large size, because space for accepting primary light sources must be prepared around both sides of the guide plate.

(2) It is difficult to employ structure in which an asymmetric prism sheet is incorporated Asymmetric prism sheets are designed under a condition that guide plates receive light supply from one side direction, as shown in FIG. 1, and light supply from both side directions will not provide good performance.

(3) It is also difficult to realize series arrangement including three or more primary light sources disposed along a direction of depth (i.e. direction of primary light supply).

SUMMARY OF INVENTION

An object of the present invention is to provide a surface light source device that is capable of presenting a large shining area with ease as well as capable of securing spaces for arrangement of an increased number of primary light sources without difficulty. Another object of the present invention is to provide a surface light source device that is capable of presenting a shining area easily enlarged depending on the number of employed primary light sources if the number increases over two.

Still another object of the present invention is to provide a surface light source device that is capable of employing a plurality of primary light sources together with an asymmetric prism sheet without contradiction.

The surface light source device in accordance with the present invention is provided with a guiding-emission mechanism which comprises a first-step plate-like guide block B L 1, a second-step plate-like guide block B L 2 . . . a N−1 th-step plate-like guide block B L N−1 and a N th-step plate-like guide block B L N (N≧2) disposed tandem so as to provide a large continuous emission area and further comprises primary light sources L 1, L 2 . . . L N−1 and L N to supply respectively said guide blocks B L 1, B L 2 . . . B L N−1 and B L N with primary light.

And each of said guide blocks B L 1 through B L N is provided with an incidence end face to receive primary light, a distal portion oppositely located with respect to the incidence end face, and an emission face to output illumination light.

Besides, at least each of said guide blocks B L 1 to B L N−1 has thickness which tends to be decreasing with increasing distance from the corresponding incidence end face. And each of distal portions of the k th-step (k=1 . . . N−1) guide clocks has a back face provided with a recess to be used for disposing the primary light source L k+1. The primary light source L k+1 supplies the incidence end face of the k+1 th-step guide block B L k+1 with primary light.

A shield is disposed between the primary light source L k+1 and the guide block B L k so that the primary light source L k+1 avoids supplying the guide block B L k with direct light.

According to a preferable embodiment, each of distal portions of the respective k th-step guide blocks B L k (k=1 . . . N−1) is provided with an overlapping portion which overlaps onto the k+1 th-step guide blocks B L k+1. In this case, each overlapping portion is preferably formed so that overlapping length onto the k+1 th-step guide block B L k+1 is relatively great at a side edge portion.

At least two of said guide blocks B L 1, B L 2, . . . B L N−1, B L N disposed tandem may provide a guide block combination consisting of a unified guide plate. A plurality of tandem guiding-emission mechanisms may be arranged side by side.

At least one of said primary light sources has a shape such that both end portions including electrode sections may have curved portions while a linear portion excluding said curved portions is disposed along an incidence end face of a corresponding guide block.

Further, it is to be noted that an asymmetric prism sheet, if disposed along an emission face, arises no problem because directivity of light supply is common throughout the light guide blocks.

BEST PREFERRED EMBODIMENTS

In figures to be referred for describing embodiments, dimension such as thickness of guide blocks and prism sheets, and pitch and depth of prism rows are exaggerated for the sake of illustration.

And the description below puts the case that elements such as guide blocks B L 1, B L 2 are made of a light scattering and guiding material. Matrix of the light scattering and guiding material is, for example, polymethylmethacrylate (PMMA). Substance of different refractive index is, for example, fine particle silicone resin. Guide blocks may be alternatively made of transparent resin such as acrylic resin.

<First Embodiment>

Figures 2, 2A:
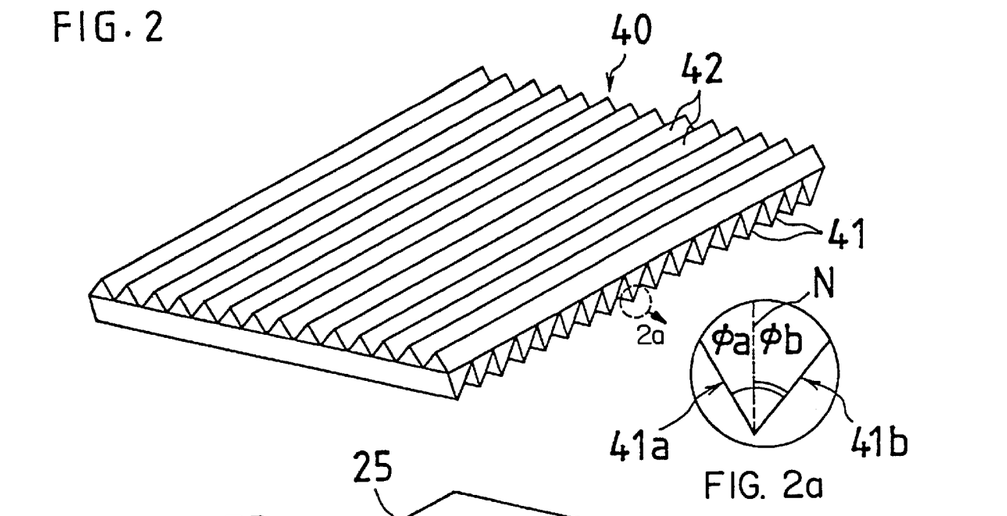
FIG. 2 is a perspective exploded view of a first embodiment.

Referring to FIG. 2, a first-step and second-step guide blocks B L 1, B L 2 are arranged tandem in a direction of primary light supply. The present embodiment employs two guide blocks included in the tandem arranged. It should be noted that number of steps constituting tandem arrangement may be, in general, N (N≧2) not less than 2.

One end face of each guide block B L 1, B L 2 provides an incidence end face 12, 22 which is supplied with primary light from a primary light source (such as cold cathode lamp) L 1, L 2. Each guide block B L 1, B L 2 has a tendency such that thickness is decreasing toward a distal portion 17, 27 with increasing distance from the incidence end face 12, 22.

In this embodiment, a wedge-shape is shown as a typical profile. The above tendency of thickness is represented by "wedge shape" in the following description.

Such a feature of shape provides a recess located at a back side of a distal portion 17 of the first-step guide block B L 1. The recess is utilized for disposing a second-step primary light source L 2 which supplies primary light to the second-step guide block B L 2.

In general cases where number of steps is N (N≧2), a recess is formed at each back side of each distal portion of the k th-step guide block B L k (k=1 . . . N−1), being utilized for disposing a k+1 th-step primary light source L k+1. The k+1 th-step primary light source L k+1 supplies primary light toward an incidence end face of the k+1 th-step guide block B L k+1. The first-step primary light source L 1 is disposed along the incidence end face 12 according to a conventional manner of arrangement.

It should be noted that a reflection member R 2 or 13 disposed between the first-step guide block B L 1 and the second-step primary light source L 2 has a light shielding function, thereby substantially inhibiting the primary light source L 2 from supplying light directly to the guide block B L 1. This prevents excessive brightening from emerging at or around the distal portion 17.

Figure 3:
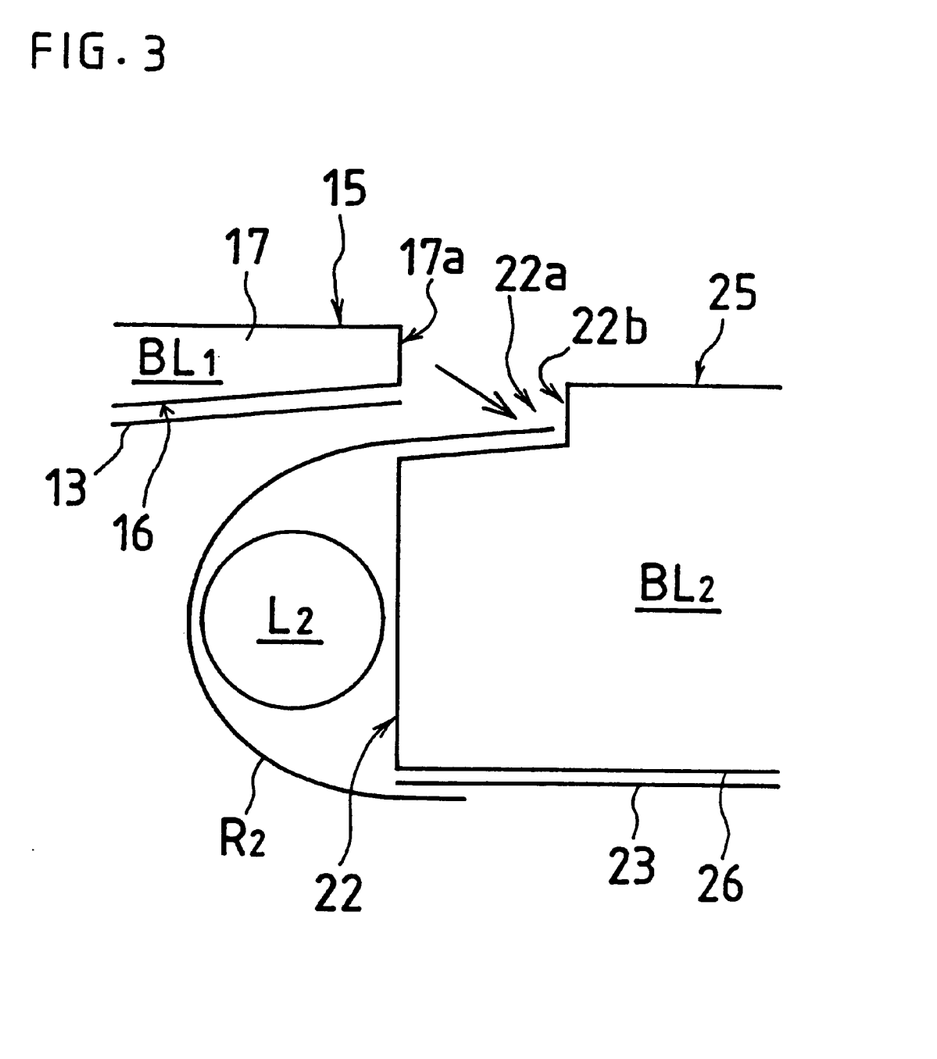
FIG. 3 is an enlarged cross sectional view around primary light source L 2 shown in FIG. 2.

An enlarged cross sectional view around the primary light source L 2 is illustrated in FIG. 3. As shown therein, the guide block B L 2 has a cutout 22a which is formed at an edge of the emission face 25 around the incidence 22. On the other hand, a distal portion 17 of the guide block B L 1 is designed so that its shape and dimension coordinates with that of the cutout 22a.

At assembling, an abutting face 17a of the distal potion 17 is put into the cutout 22a so as to be abutted against an abutting face 22b of the cutout, as indicated with a thick arrow. The abutting face 17a may be fixed to the abutting face 22b with a transparent adhesive.

A reflection member 13 disposed behind the primary light L 2 has a distal portion extending into the cutout 22. Besides, reflection members and 23 are disposed along back faces 16 and 26 of the guide blocks B L 1, B L 2, the reflection member 13 having a distal portion which is put on the reflection member R 2 at assembling so as to be interposed between the reflection member R 2 and the distal portion 17 within the cutout 22a. An overlapping portion of both guide blocks B L 1, B L 2 is formed by a portion which encroach into the cutout 22a.

Such construction enables the emission faces to provide a continuous emitting area without interruption at an boundary (please see FIG. 2). And coordination of shape and dimension of the abutting face 17a with that of the cutout 22b enables the boundary B R to have no stepwise unevenness.

As shown in FIG. 2, the present embodiment employs a single piece of both-prism-face prism sheet 40 disposed along the emission faces 15 and 25 which are flattened overall as mentioned above. The both-prism-face prism sheet 40 has an inner face provided with prism rows 41 and an outer face provided with prism rows 42. The inner prism rows 41 line up so as to be roughly in parallel with the incidence end faces 12, 22 while the outer prism rows 42 line up so as to be roughly perpendicular to the incidence end faces 12, 22.

The prism sheet 40 may be an asymmetric prism sheet. That is, as shown in an accompanying enlarged illustration, a first slope 41a and second slope 41b of the inner prism rows 41 may make different angles φa and φb to a normal with respect to a general extending direction of the whole sheet. A preferable set of angles φa and φb are φa=5.6° and φb=35°.

As described above, a guiding-emission mechanism of tandem-type is provided by the guide blocks B L 1, B L 2 arranged tandem and the primary light sources L 1, L 2 supplying primary light respectively to the guide blocks B L 1, B L 2. Although the prism sheet is preferably arranged, as in the present embodiment, so as to cover over the guiding-emission mechanism, a plurality of prism sheets may be employed to cover overall sometimes.

As shown in FIG. 2, a housing (case) 50 receives an assembly composed of the guide blocks B L 1, B L 2 arranged tandem, the primary light sources L 1, L 2 and the prism sheet 40. The housing 50 comprises a rectangular frame 55 which is provided inside with a primary light source setting portions 51, 52 and guide block setting portions 53, 54.

The primary light source setting portions 51, 52 have slopes which fit inclinations of back face 16, 26 of the guide blocks B L 1, B L 2 and sometimes provide reflective surfaces, respectively. Fixing pawls 66 for fixing members to be accommodated by the housing 50 are disposed at required positions on an inner wall of the frame 55.

Action (behavior of light) of the first embodiment constructed as above described is outlined as follows. For the sake of explanation, the outlines are itemized.

(1) First-step guide plate B L 1; The primary light source L 1 emits light, which is introduced into the guide block L 1 and is guided toward a distal portion 17 at thinner side, with being subject to scattering and reflection. In this process, illumination light is emitted gradually and obliquely forward preferentially from the emission face 15. As mentioned above, the guide block B L 1 is supplied with no direct light from the primary light source B L 1. This prevents excessive brightening from occurring at or around the distal portion 17.

However, effects such as scattering can cause the guide block B L 1 to have an inflow of light that consists of a very small part of light introduced once into the guide block B L 2 and enters into the guide block B L 1 through the abutting faces 22b and 17a.

And, there can be a flow of light, though quite small, from the guide block B L 1 to the guide block B L 2 through the abutting faces 22b and 17a. To control such flow of dual directions, an end portion of reflection member 13 or R 2 may encroach between the abutting faces 17a and 22b to some desirable extent in FIG. 3.

(2) Second-step guide plate B L 2; The primary light source L 2 emits light, which is introduced into the guide block L 2 and is guided toward a distal portion 27 at thinner side, with being subject to scattering and reflection. In this process, illumination light is emitted gradually and obliquely forward preferentially from the emission face 25.

As mentioned above, the guide block B L 1 can have an inflow of light that consists of a very small part of light introduced once into the guide block B L 2 and enters into the guide block B L 1 through the abutting faces 22b and 17a. And, there can be a flow of light, though quite small, from the guide block B L 1 to the guide block B L 2 through the abutting faces 22b and 17a.

The employed advantageous structure (please see FIG. 3), such that the distal portion 17 of the guide block B L 1 encroaches onto the next step guide block B L 2 by a small length to form an overlapping portion, prevents both guide blocks B L 1 and B L 2 arranged tandem not only from being out of alignment but also from having uneven brightness (such as bright lines and dark lines) which is apt to appear at or around a juncture where the guide blocks B L 1 and B L 2 are joined.

(3) Both-prism-face prism sheet 40; The continuous emission area consisting of the jointed emission faces 15 and 25 emits light preferentially to an oblique and forward direction, which is then corrected to a frontal direction in two dimensions by the both-prism-face prism sheet 40.

That is, correction is realized first toward an approximately frontal direction regarding in a plane perpendicular to the incidence end faces 12, 22 by means of the inner prism rows 41. And then correction is realized toward an approximately frontal direction regarding in a plane parallel to the incidence end faces 12, 22 by means of the outer prism rows 42.

It should be noted that the emission area is able to has overall uniform characteristics if the prism sheet 40 is the aforementioned asymmetric prism sheet because the guide blocks B L 1 and B L 2 are supplied with light commonly directed and accordingly the asymmetric prism sheet acts on both emission from the emission face 15 and emission from the emission face 25 equivalently.

<Second Embodiment>

Figure 4:
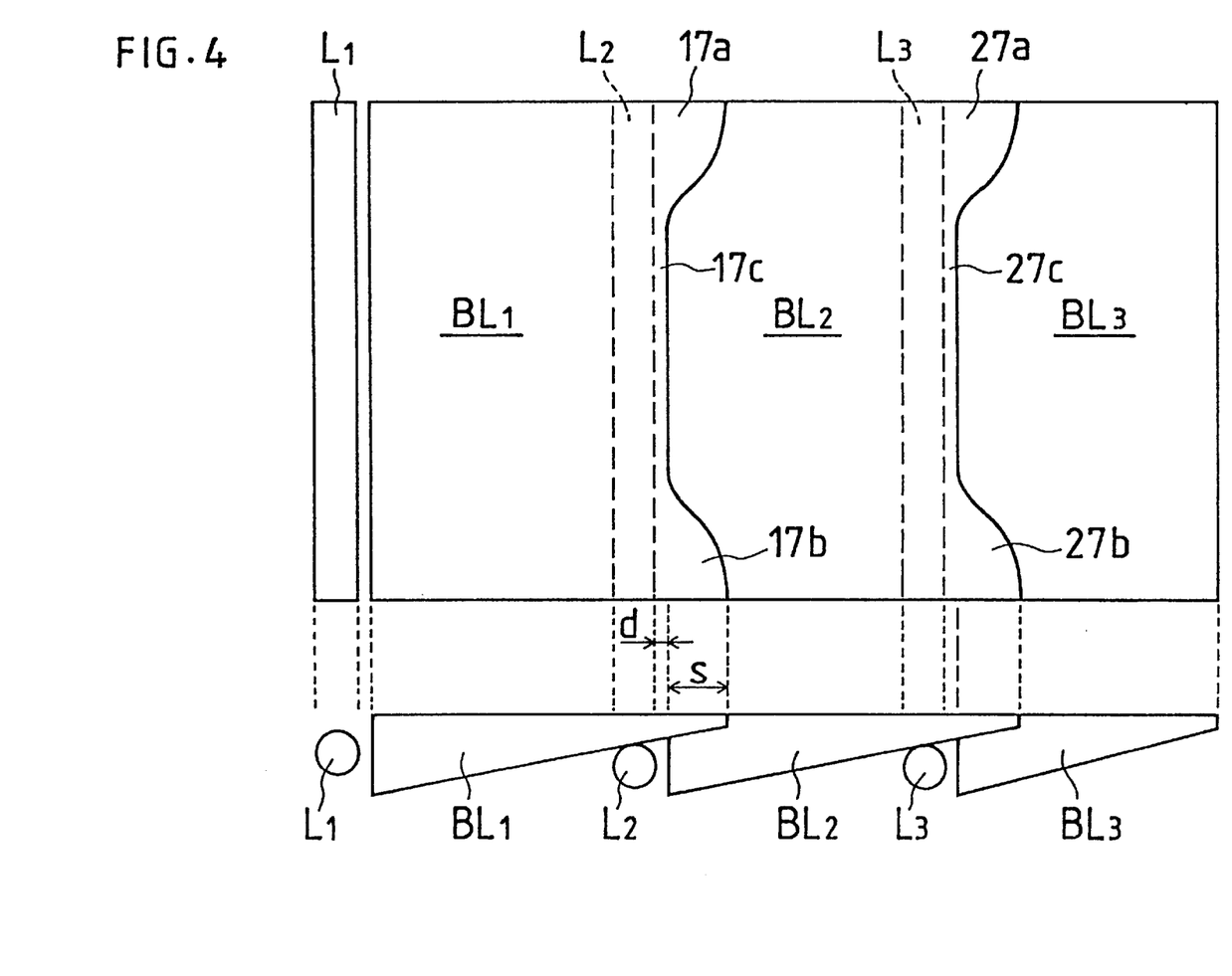
FIG. 4 is an illustration with a plan view and side view of an outline structure of a second embodiment of the present invention.

This embodiment is provided by partially modifying the above structure of the first embodiment. Accordingly, description is focused onto different points in comparison with the first embodiment while repeated description of structure and effect common to both is omitted. FIG. 4 is an illustration with a plan view and side view of an outline structure of the second embodiment, where illustration of elements such as prism sheet, reflection member and housing is omitted.

The total number N of guide blocks arranged tandem is three, namely, N=3. In other words, a guide block B L 3 is additionally arranged to follow the guide blocks B L 1 and B L 2 while three primary light sources L 1, L 2 and L 3 are arranged accordingly. The primary light source L 1 is disposed along an incidence end face of the guide block B L 1 which is supplied with primary light by the primary light source L 1.

The other primary light sources L 2 and L 3 are disposed at recesses formed around distal portions of the guide blocks B L 1 and B L 2, respectively.

Next, it is important that an ingenious shaping is employed at overlapping portions where the distal portions of the guide blocks B L 1, B L 2 are encroach upon the following guide blocks B L 2, B L 3, respectively. That is, the overlapping portions consist of tongue-like overlapping portions 17a, 17b, 27a, 27b and band-like overlapping portions 17c, 27c.

As shown in the plan view, the tongue-like overlapping portions 17a, 17b, 27a, 27b have overlapping distance s at parts overlapping both side edges of the guide blocks B L 2, B L 3 while the band-like overlapping portions 17c, 27c have overlapping distance d which is smaller than overlapping distance s, respectively.

Such overlapping structure prevents short of brightness which would be apt to occur around both end portions of the primary light sources L 2, L 3 owing to electrodes located at the end portions. Desirable values of overlapping distance d and s are determined according to design and an example gives d=5 mm and s=20 mm.

The guide blocks B L 1, B L 2, B L 3 are, for example, 5 mm at the thickest portions (without considering thickness reduction by cutouts for B L 2, B L 3) and 1 mm at the thinnest portions. To fit this, diameter of the primary light sources L 1, L 2, L 3 is, for example, 3 mm.

Action (behavior of light) of the second embodiment is outlined in the same manner as that of the first embodiment. However, it should be noted that the above-described ingenious overlapping structure will provide an improved degree of brightness evenness.

<Third Embodiment>

Figure 5:
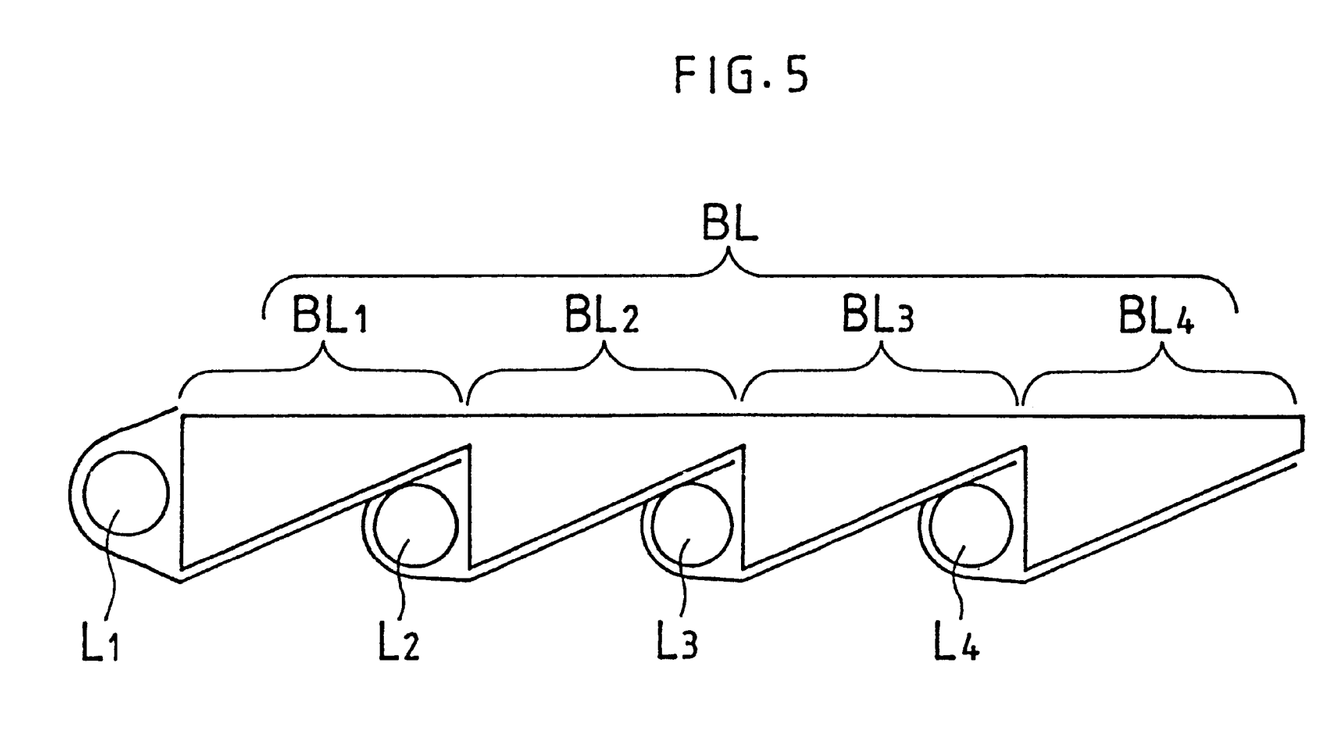
FIG. 5 is a side cross sectional view of an outline structure of a third embodiment.

In the above first and second embodiments, each of the guide blocks arranged tandem is one body as a guiding member. Alternatively, a plurality of guide blocks B L 1, B L 2, B L 3, B L 4 arranged tandem may form one unified guiding member to provide a guide block unit, as shown in FIG. 5.

According to still another alternative arrangement, guide blocks B L 1, B L 2 form one unified guiding member while guide blocks B L 3, B L 4 form another unified guiding member, and both unified guiding members are jointed. Thus the third embodiment is defined as arrangement including a guide block unit composed of all or a part of a plurality of guide blocks which are arranged tandem. The third embodiment has an advantage that guide blocks forming one guide block unit is naturally provided with a continuous emission face, thereby preventing boundaries from being conspicuous.

<Fourth Embodiment>

In the above first, second and third embodiments, linear-rod-like primary light sources are employed. Since such linear-rod-like primary light sources have electrode portions at respective both ends, short of brightness is apt to arise around the electrode portions. In the second embodiment, this is avoided by means of an ingeniously structured overlapping portions. According to a feature of the present embodiment, the problem is solved by employing primary light sources provided with curved both ends.

Figure 6:
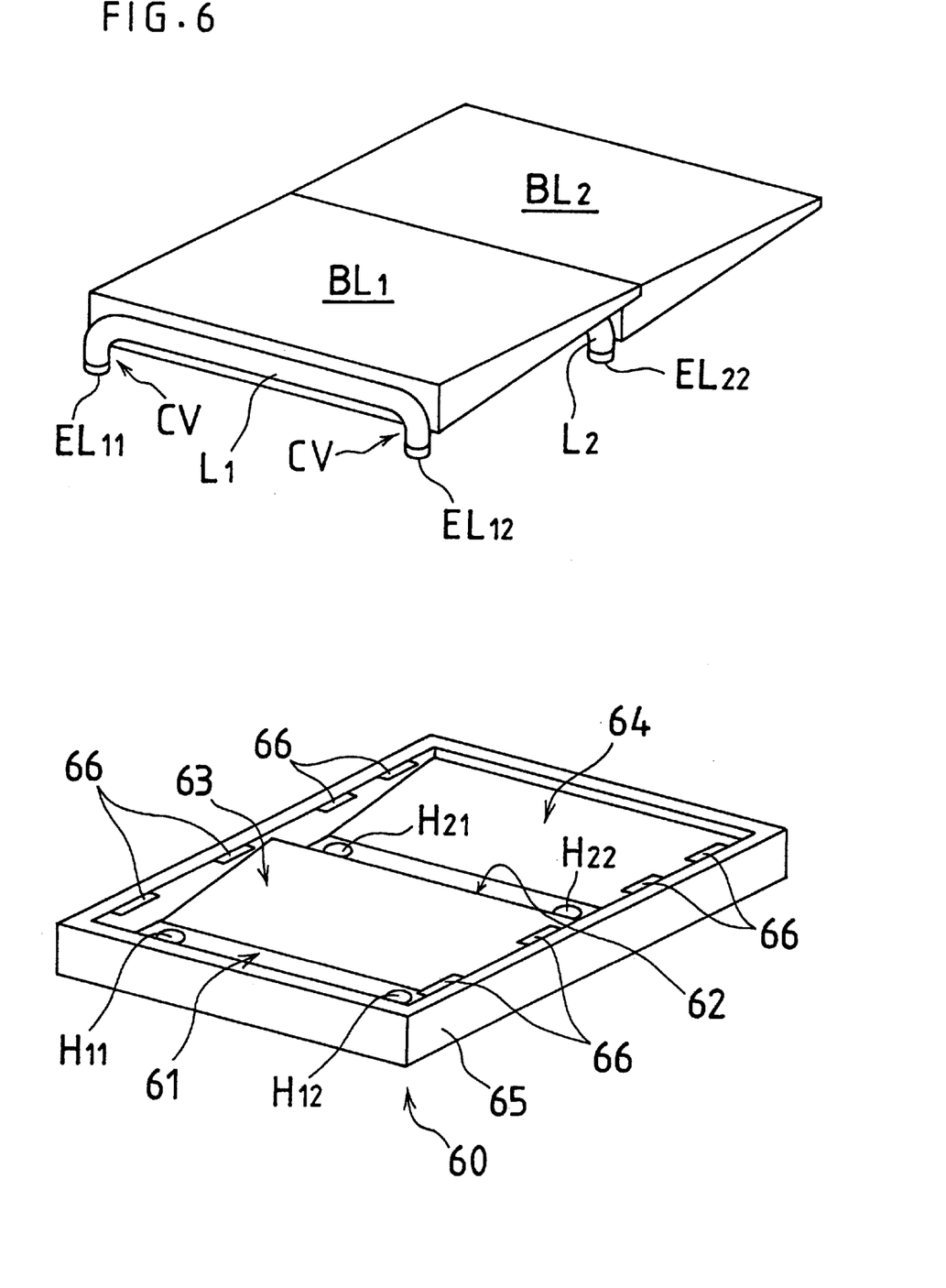
FIG. 6 is a perspective view of an outline structure of a forth embodiment.

FIG. 6 is a perspective view of an outline structure of the forth embodiment, where illustration of members such as prism sheet and reflection member is omitted. Referring to the illustration, a first-step and second-step guide blocks are indicated with B L 1 and B L 2 arranged tandem in a direction of primary light supply, respectively. Although the illustrated arrangement employs two guide blocks arranged tandem, steps N of tandem arrangement may be more than two (N≧2).

In the same way as that of the first embodiment, an end face of each of guide blocks B L 1 and B L 2 provides an incidence end face to receive primary light. And thickness tends to decrease according to distance from the incidence end faces.

The present embodiment employs primary light sources L 1, L 2 with a featured shape. That is, the employed primary light sources L 1, L 2 have curved portions C V including both end electrode portions E L 11, E L 12, E L 22 (, where one electrode portion of the primary light source L 2 is not shown). The primary light source L 2 is arranged at a recess which is formed on a back side of a distal portion of the first-step guide block B L 1.

Corresponding to the featured primary light sources L 1, L 2, a housing (case) 60 is structured somewhat differently in comparison with that of the housing 50 employed in the first embodiment.

That is, the housing 60 has a rectangular frame 65 inside of which primary light source setting portions 61, 62 and guide block setting portions 63, 64 are arranged, wherein the primary light source setting portions 61, 62 are provided with escape holes H 11, H 12, H 21, H 22 through which electrodes corresponding to the respective curved portions pass.

The primary light source setting portions 61, 62 have slopes which fit inclinations of back face of the guide blocks B L 1, B L 2 and sometimes provide reflective surfaces, respectively. Fixing pawls 66 for fixing members to be accommodated by the housing 50 are disposed at required positions on an inner wall of the frame 65.

According to the forth embodiment structured as above, linear portions between both curved portions C V are disposed overall along the respective incidence end faces when elements including the guide blocks are accommodated by the housing 60. As a result, short of brightness owing to the electrode portions does not arise.

<Fifth Embodiment>

In the above first through forth embodiments, each tandem surface light source device employs a sole guiding-emission mechanism of tandem type which comprises one set of tandem-arranged guide blocks and primary light sources for supplying primary light to the respective guide blocks.

Figure 7:
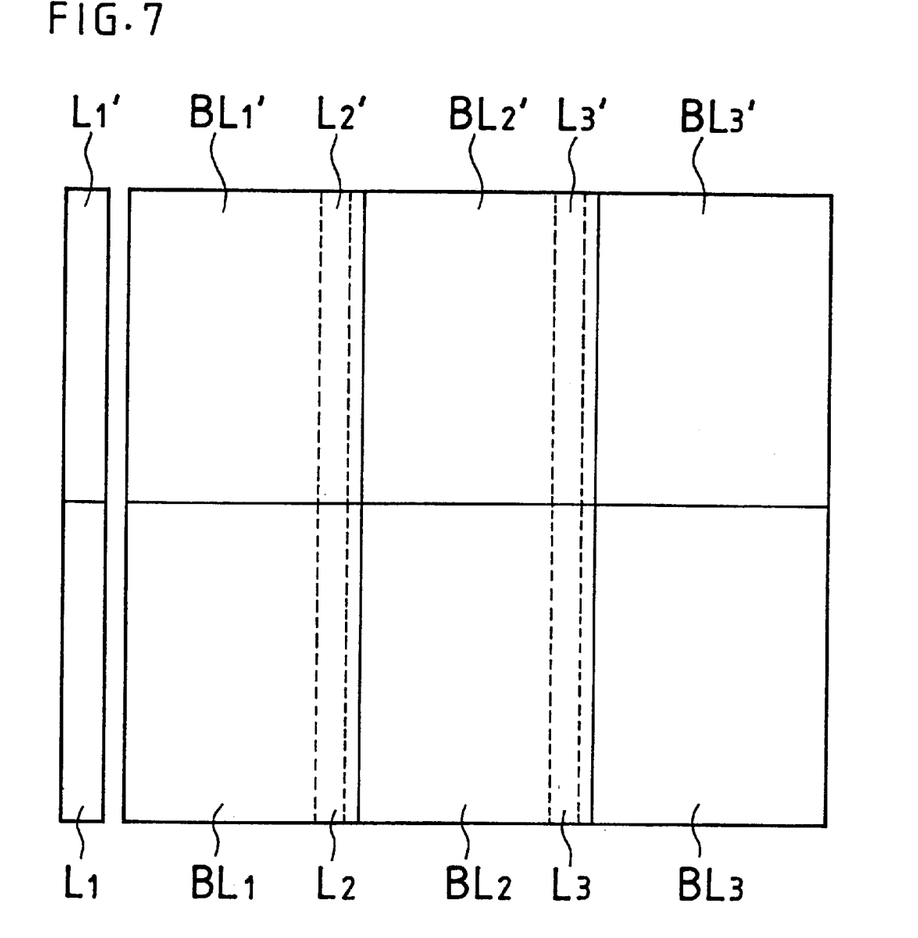
FIG. 7 is a upper plan view of an outline structure of a fifth embodiment in accordance with the present invention.

However, a plurality of such guiding-emission mechanisms of tandem type may be arranged side by side. An arrangement of such type is shown in FIG. 7 illustrating an outlined plan view of the fifth embodiment, where elements such as prism sheet, reflection member and housing are eliminated in the illustration.

As shown in the illustration, one guiding-emission mechanism of tandem type is composed of guide blocks B L 1, B L 2, B L 3 and primary light sources L 1, L 2, L 3 supplying primary light to the respective guide blocks while another guiding-emission mechanism of tandem type is composed of guide blocks B L 1', B L 2', B L 3' and primary light sources L 1', L 2', L 3' supplying primary light to the respective guide blocks.

These two guiding-emission mechanisms of tandem type are arranges side by side, thereby providing a tandem surface light source device having an emission area which is enlarged in two dimensions. Each of the mechanisms may be constructed in the same way as the first through forth embodiments.

According to generalization of the idea employed in the present embodiment, guide blocks are arrayed lengthwise and crosswise, as Japanese traditional rectangular mats are arrayed, and primary light sources for supplying primary light are arranged corresponding to the respective guide blocks, which is capable of leading to a tandem surface light source device having a very large emission area.

It should be noted, although not mentioned in the individual embodiment, that a liquid crystal display is constructed by laminatedly disposing elements such as a polarization separation sheet, liquid crystal display panel and others at outside of a tandem surface light source device, in the same manner as shown in FIG. 1.

And, although every embodiment employs guide blocks all of which have relatively thinner distal portions, the last-step guide blocks are not required necessarily to have relatively thinner distal portions. This is because no space for disposing a primary light source to supply light to a next-step guide block is needed However, in order to provide the whole emission area with even characteristics, it is preferable to employ guide blocks all of which are equally shaped.

According the present invention, a surface light source device having a large emission area is obtained with ease. And, if an increased number of primary light sources are employed, spaces for arranging the primary light sources are prepared without difficulty. Further, the present invention provides a surface light source device which is suitable for employment of an asymmetric prism sheet.

What is claimed is:

1. A tandem surface light source device provided with a guiding-emission mechanism, said guiding-emission mechanism comprising:

a first-step plate-like guide block B L 1, a second-step plate-like guide block B L 2 ... a N−1 th-step plate-like guide block B L N−1 and a N th-step plate-like guide block B L N (N≧2) which are disposed tandem to provide a large continuous emission area; and primary light sources L 1, L 2 ... L N−1 and L N to supply respectively said guide blocks B L 1, B L 2 ... B L N−1 and B L N with primary light, each of said guide blocks B L 1 through B L N being provided with an incidence face to receive primary light, a distal portion oppositely located with respect to the incidence face and an emission face to output illumination light, at least each of said guide blocks B L 1 to B L N−1 having thickness which tends to decrease as distance from the corresponding incidence face increases, each of distal portions of the k th-step (k=1 ... N−1) guide blocks having a back face provided with a recess to be used for disposing the primary light source L k+1 for supplying the incidence end face of the k+1 th-step guide block B L k+1 with primary light, a shield is disposed between the primary light source L k+1 and the guide block B L k so that the primary light source L k+1 avoids supplying the guide block B L k with direct light.

2. A tandem surface light source as defined in claim 1, wherein each of distal portions of the respective k th-step guide blocks B L k (k=1 ... N−1) is provided with an overlapping portion which overlaps onto the k+1 th-step guide blocks B L k+1.

3. A tandem surface light source as defined in claim 1, wherein each of distal portions of the respective k th-step guide blocks B L k (k=1 ... N−1) is provided with an overlapping portion which overlaps onto the k+1 th-step guide blocks B L k+1, said overlapping portion is formed so that overlapping length onto the k+1 th-step guide block B L k+1 is relatively great at a side edge portion.

4. A tandem surface light source as defined in claim 1, wherein at least two of said guide blocks B L 1, B L 2, ... B L N−1, B L N disposed tandem provide a guide block combination consisting of a unified guide plate.

5. A tandem surface light source as defined in claim 1, wherein a plurality of tandem guiding-emission mechanisms are arranged side by side.

6. A tandem surface light source as defined in claim 1, wherein at least one of said primary light sources has a shape such that both end portions including electrode sections have curved portions while a linear portion excluding said curved portions is disposed along an incidence face of a corresponding guide block.

7. A tandem surface light source as defined in claim 1, wherein an asymmetric-prism-faced sheet is disposed along the emission faces of said guide blocks B L 1, B L 2, ... B L N−1, B L N disposed tandem.

* * * * *

UNITED STATES PATENT AND TRADEMARK OFFICE
CERTIFICATE OF CORRECTION

PATENT NO. : 6,241,358 B1  Page 1 of 1
DATED : June 5, 2001
INVENTOR(S) : Eizaburo Higuchi et al.

It is certified that error appears in the above-identified patent and that said Letters Patent is hereby corrected as shown below:

Title page,
Item [54], change "TANDEM SURFACE LIGHTING PANEL" to -- TANDEM SURFACE LIGHT SOURCE DEVICE --.

Item [75], change "Setagaya-ku" to -- Tokyo --; change "Nerima-ku" to -- Tokyo --.

Column 1,
Line 1, change title "TANDEM LIGHTING PANEL" to -- TANDEM SURFACE LIGHT SOURCE DEVICE --.
Line 36, change "(xPMMA)" to -- (PMMA) --.

Column 2,
Line 15, insert -- ) -- after quotation.

Column 9,
Line 47, insert -- . -- after "needed".

Signed and Sealed this

Nineteenth Day of February, 2002

Attest:

*Attesting Officer*

JAMES E. ROGAN
*Director of the United States Patent and Trademark Office*